United States Patent
Soles et al.

(10) Patent No.: US 7,150,451 B2
(45) Date of Patent: Dec. 19, 2006

(54) AIR SPRING AND JOUNCE SHOCK ASSEMBLY

(75) Inventors: Peter J. Soles, Tecumseh (CA); Yunjun Li, West Bloomfield, MI (US); Jeremy W. Short, Berkley, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 58 days.

(21) Appl. No.: 11/061,274

(22) Filed: Feb. 18, 2005

(65) Prior Publication Data

US 2006/0186586 A1 Aug. 24, 2006

(51) Int. Cl.
*F16F 9/04* (2006.01)

(52) U.S. Cl. .................. 267/64.27; 267/122; 267/226; 267/64.21

(58) Field of Classification Search ............. 267/64.11, 267/64.13, 64.19, 64.21, 64.23, 64.24, 64.25, 267/64.26, 64.28, 122, 726

See application file for complete search history.

(56) References Cited

U.S. PATENT DOCUMENTS

| | | | |
|---|---|---|---|
| 6,398,179 B1 | 6/2002 | Soles | |
| 6,422,543 B1 * | 7/2002 | Fejerdy | 267/122 |
| 6,644,632 B1 * | 11/2003 | Jaberg | 267/64.21 |
| 6,923,434 B1 * | 8/2005 | Schisler | 267/64.27 |

* cited by examiner

*Primary Examiner*—Devon Kramer
(74) *Attorney, Agent, or Firm*—Laura C. Hargitt

(57) ABSTRACT

The present invention concerns an air spring and jounce shock assembly for use in an automotive vehicle suspension system. The assembly may include a base adapted to be mounted on one of an axle assembly and a suspension component, a top cap adapted to be attached to a vehicle frame, and a diaphragm disposed between and attached to the base and the top cap, with the diaphragm including an inner surface defining a first portion of a compressed air cavity. A jounce shock reaction surface defines a second portion of the compressed air cavity and is included in a one of the top cap and the base. A jounce shock assembly is disposed in the air cavity in opposed relation to the jounce shock reaction surface and affixed to an other of the top cap and the base, with the jounce shock assembly including a body, affixed to the other of the top cap and the base and defining a compressed gas chamber, and a rod having a first end portion in the compressed gas chamber sealably engaged with and slidable relative to the body and a second end portion telescopically slidable from the body and located to selectively engage the jounce shock reaction surface.

20 Claims, 4 Drawing Sheets

AIR SPRING AND JOUNCE SHOCK ASSEMBLY

BACKGROUND OF INVENTION

The present invention relates generally to vehicle suspension systems and, in particular, to vehicle suspension systems employing air springs.

Some automobile and truck suspension systems include air springs mounted between an axle assembly (or suspension system component) and a vehicle frame (or body). Air springs typically include a base, mounted to the axle assembly, a top cap, mounted to the frame, and a diaphragm disposed between and attached to the base and the cap. The diaphragm defines an inflatable compressed air cavity that is compressible during operation of the vehicle to smooth the vehicle's ride.

Vehicles equipped with the air springs also typically include jounce bumpers, which are blocks of rubber mounted between the vehicle suspension system and frame that prevent a vehicle from bottoming out during operation. That is, the rubber jounce bumpers are sandwiched between the suspension components and frame to prevent hard metal to metal contact. Mounting jounce bumpers and the air springs separately, however, requires a larger amount of packaging space and comprises more separate parts than is desirable, and also increases the complexity of assembly for the suspension system. Moreover, jounce bumpers tend to create a rebound spring reaction, referred to as kickback, that is not desirable since they only provide a relatively brief, hard impact without appreciable damping.

Some have suggested mounting of integrating the jounce bumpers inside the air springs. However, this does not alleviate the undesired kickback phenomenon. It is desirable, therefore, to provide a vehicle suspension system that provides both an air spring and a jounce bumper function, and which is packaged in a relatively small amount of space, while also alleviating kickback concerns.

SUMMARY OF INVENTION

An embodiment of the present invention concerns an air spring and jounce shock assembly for use in a vehicle suspension system. The assembly may include a base adapted to be mounted on one of an axle assembly and a suspension component, a top cap adapted to be attached to a vehicle frame, and a diaphragm disposed between and attached to the base and the top cap, with the diaphragm including an inner surface defining a first portion of a compressed air cavity. The assembly may also include a jounce shock reaction surface defining a second portion of the compressed air cavity and included in a one of the top cap and the base, and a jounce shock assembly disposed in the air cavity in opposed relation to the jounce shock reaction surface and affixed to an other of the top cap and the base, with the jounce shock assembly including a body, affixed to the other of the top cap and the base and defining a compressed gas chamber, and a rod having a first end portion in the compressed gas chamber sealably engaged with and slidable relative to the body and a second end portion telescopically slidable from the body and located to selectively engage the jounce shock reaction surface.

An advantage of an embodiment of the present invention is the reduced packaging space needed due to the incorporation of a jounce shock member into an air spring assembly.

The assembly in accordance with the present invention advantageously reduces vehicle complexity by reducing the number of parts mounted to the vehicle suspension and frame. This may also reduce assembly complexity, and the number of different parts on hand at a vehicle assembly plant.

Another advantage of an embodiment of the present invention is that the jounce shock is protected from the external environment.

Additionally, the assembly may be interchangeable with conventional air spring configurations, thus providing an easy retrofit of the conventional air spring by replacing it with an integral air spring and jounce shock assembly.

DETAILED DESCRIPTION

Figure 1:
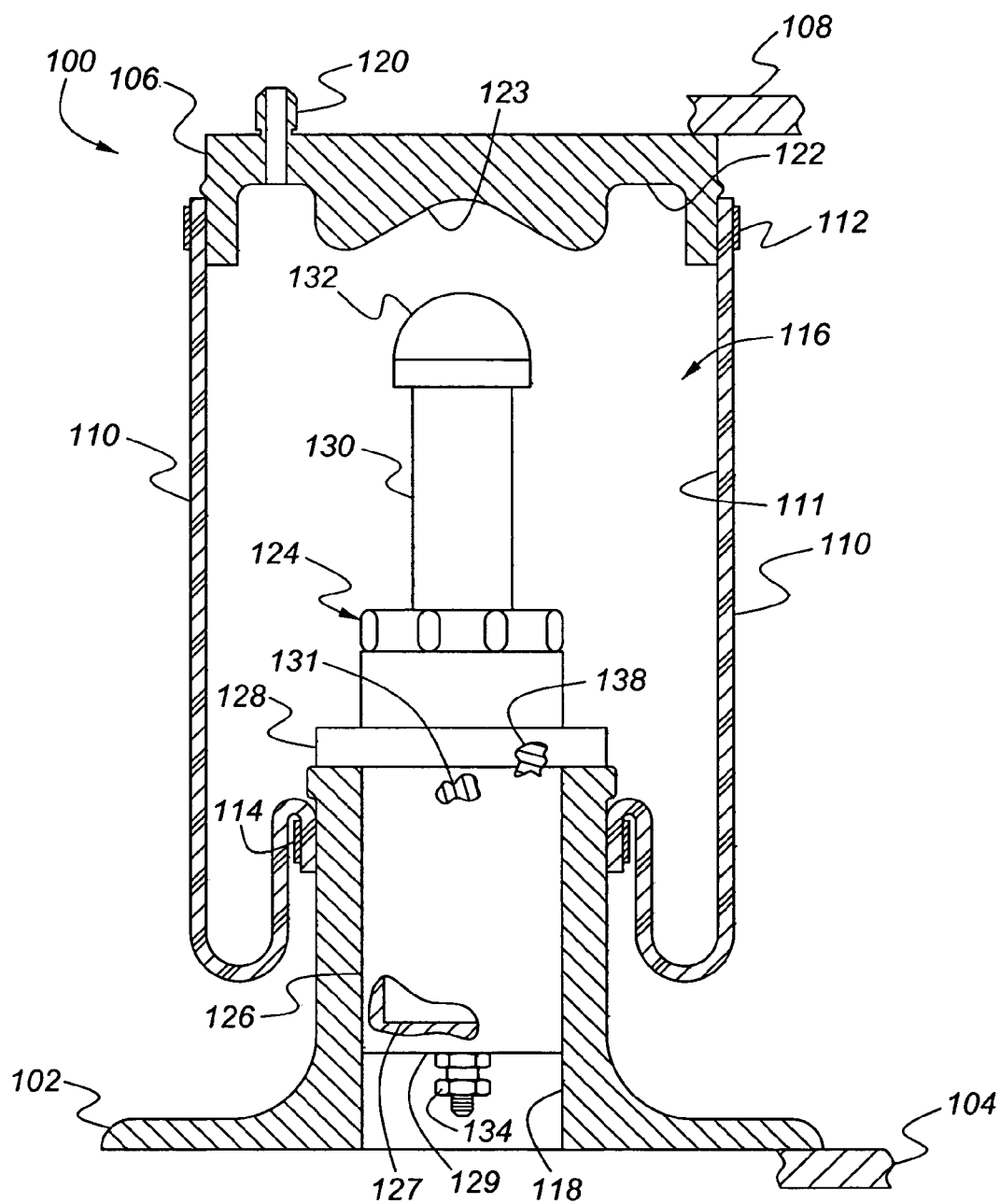
FIG. 1 is a partial cross sectional view of an air spring and jounce shock assembly in accordance with a first embodiment of the present invention.

Referring now to FIG. 1, an air spring and jounce shock assembly in accordance with the present invention is indicated generally at 100. The assembly 100 includes an air spring base 102 that is attached to a vehicle axle assembly (or other suspension component, such as a control arm) 104. The base 102 is preferably formed of steel, aluminum, a composite material, or the like. The assembly 100 also includes an air spring top cap 106 that is attached to a vehicle frame (or body, which will be considered the same as a frame in terms of describing and defining the invention herein) 108. The cap 106 is also preferably formed of steel, aluminum, a composite material, or the like. The term vehicle frame as used herein includes the frame itself and any bracket affixed to the frame to mounting an air spring thereto. For a unibody vehicle, the air spring may be mounted to the body or a bracket affixed to the body.

An air spring diaphragm 110 is attached to and seals between the base 102 and the top cap 106. The diaphragm 110 includes an inner surface 111 that defines a compressed air cavity 116 between the base 102 and the top cap 106. The diaphragm 110 is preferably formed of an elastomeric material such as rubber or the like, and is attached to the top cap 106 at an upper edge thereof by an upper clamp or spring 112 and to the base 102 by a lower clamp or spring 114 at a lower edge thereof. The top cap 106 includes an air feed line 120 extending therethrough that is connected to a source of compressed air (not shown) for supplying compressed air to the compressed air cavity 116 in a manner known to those skilled in the art. Of course, relative movement between the axle assembly 104 and frame 108 causes relative movement between the air spring base 102 and the top cap 106. When the base 102 and the cap 106 move towards each other, the air trapped in the compressed air cavity 116 compresses, resulting in a greater resistance to continued relative movement between the axle assembly 104 and the frame 108.

The air spring base 102 includes a support 118 to which a jounce shock assembly 124 is mounted. The jounce shock assembly 124 extends into the cavity 116. In this embodiment, the jounce shock assembly 124 includes a body 126 that is preferably press-fit into the support 118, with the body 126 including an outwardly extending flange 128 that abuts an upper surface of the support 118. As an alternative, the body may be integral with the air spring base 102. So, when referring to a body being mounted on or affixed to the base or top cap herein, this also includes the body being integral with the base or top cap. The body 126 is hollow and defines a chamber 127. A jounce shock charging line 134 extends through a lower wall 129 of the body 126 into the chamber 127 and is connected to a supply of compressed gas, or more preferably a compressed gas/oil mixture. While the charging line 134 may be connected to a supply of compressed gas during vehicle operation, if so desired, it is more preferable that the charging line 134 is only connected to a supply of compressed gas—and hence the chamber 127 charged— during initial assembly or when being serviced.

The jounce shock assembly 124 also includes a rod 130 that is telescopically disposed in the body 126 and extends from an upper end thereof. The rod 130 has a piston 131 connected to its lower end that seals around the periphery of the chamber 127 while allowing the rod 130 to slide up and down relative to the body 126. As an alternative, the rod 130 may have a diameter generally matching that of the chamber 127, with the lower portion of the rod 130, in effect, forming an integral piston. A piston stop 138 is fixed to the body 126 and located in the chamber 127 to limit the upward travel of the piston 131. The chamber 127 in the body 126, along with the piston 131 will trap a compressed gas/oil mixture. The compressed gas/oil mixture will cause the rod 130 to move upward until the piston 131 is seated against the stop 138.

The rod 130 also has a rod cap 132 with a blunt shape mounted on an upper free end. The top cap 106 includes a reaction surface 122 facing the rod cap 132, preferably with a reaction feature 123 that is shaped to substantially conform to the rod cap 132. Under normal operating conditions, the piston stop 138 determines the rest position of the piston 131, with the length of the rod 130 set so that there is a gap between the cap 132 of the rod 130 and the reaction surface 122. While the reaction feature 123 is shown extending over only a portion of the reaction surface 122, it may, if so desired, extend across the entire reaction surface 122.

The operation of the air spring and jounce shock assembly 100 will now be described. As the vehicle is driven under normal loading along relatively smooth terrain, the axle assembly 104 and frame 108 will move relative to one another, compressing and decompressing the air in the compressed air cavity 116, which supports the top cap 106 relative to the base 102. The jounce shock assembly 124 is sized and positioned so that the rod cap 132 remains spaced from the reaction surface 122 during the normal loading conditions. Accordingly, the air spring and jounce shock assembly 100 acts essentially as a conventional air spring under these driving conditions.

On the other hand, when the vehicle encounters terrain that causes a large energy input from an impact—such as a pothole or a curb—the air spring diaphragm 110 may allow the axle assembly 104 to drive the base 102 toward the top cap 106 and frame 108 to an extent that the rod cap 132 contacts the reaction surface 122. Any further movement of the base 102 toward the top cap 106 will now cause the reaction surface 122 to drive the rod 130 into the pressurized chamber 127. The substantial increase in the effective damping and suspension rate for this air spring and jounce shock assembly 100 over this last portion of travel will prevent the vehicle suspension from bottoming out on the frame. This eliminates the need for separate jounce bumpers and packaging spaced for them on the vehicle.

In effect, the jounce shock assembly 124 acts as a supplementary shock absorber that adds a significant amount of damping and suspension rate in the jounce (compression) direction over only a critical portion of the suspension travel. Moreover, since the jounce shock assembly 124 behaves more like a shock absorbing member, the kickback associated with conventional rubber jounce bumpers is almost eliminated. To put it another way, during jounce, the air spring and jounce shock assembly 100 provides significant spring rate growth, with the primary force generated by the jounce shock assembly 124 being via the gas spring created by the piston 131 in the charge chamber 127. In rebound, the jounce shock assembly 124 is critically damped so that it decouples from the reaction surface 122 and dissipates the stored energy as heat.

Figure 2:
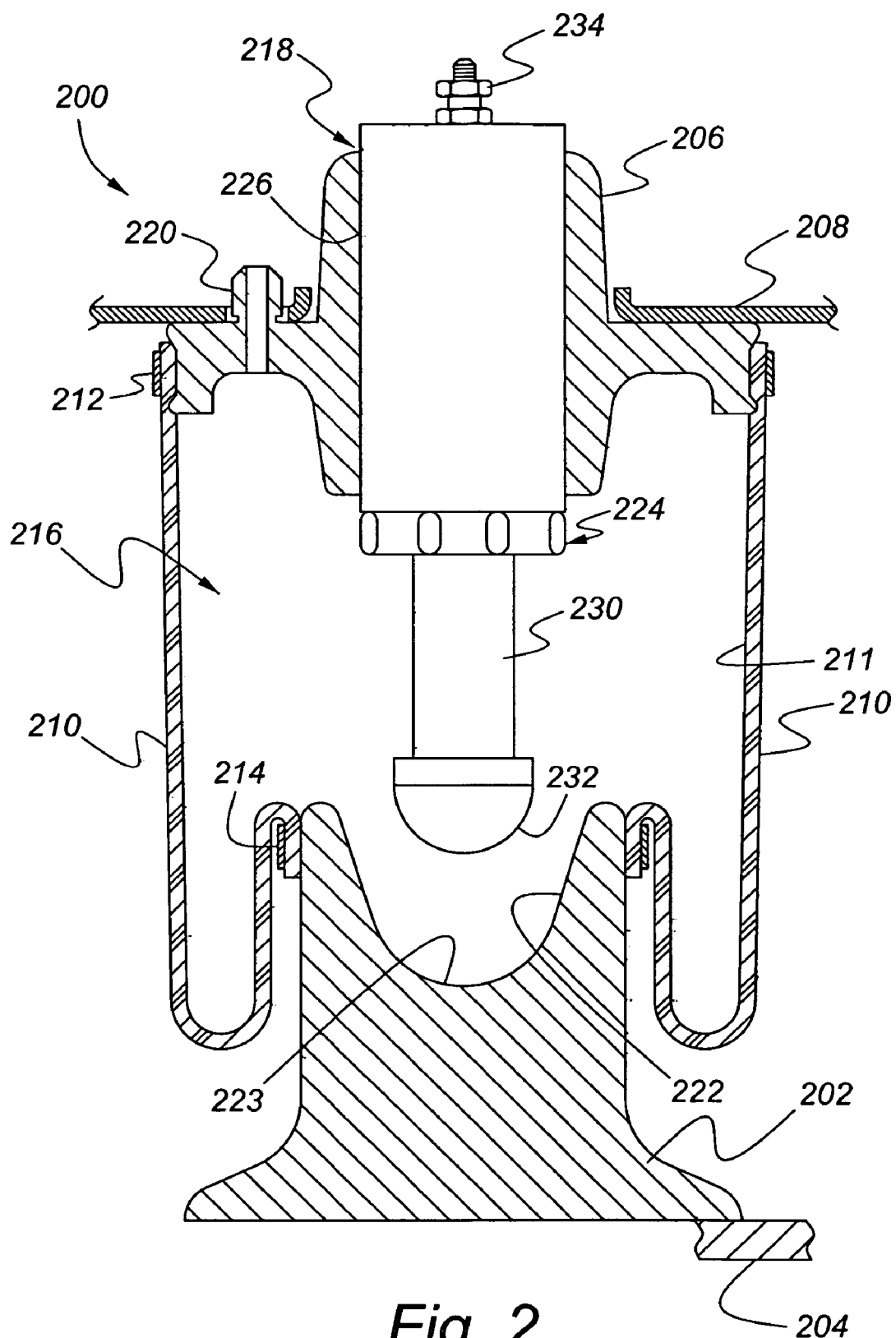
FIG. 2 is a partial cross sectional view of a second embodiment of an air spring and jounce shock assembly in accordance with the present invention.

Referring now to FIG. 2, a second embodiment of an air spring and jounce shock assembly in accordance with the present invention is indicated generally at 200. The assembly 200 includes an air spring base 202 that is attached to a vehicle axle assembly (or other suspension component, such as a control arm) 204. The assembly 200 also includes an air spring top cap 206 that is attached to a vehicle frame 208. An air spring diaphragm 210 is attached to and seals between the base 202 and the top cap 206. The diaphragm 210 includes an inner surface 211 that defines a compressed air cavity 216 between the base 202 and the top cap 206. The diaphragm 210 is preferably attached to the top cap 206 at an upper edge thereof by an upper clamp or spring 212 and to the base 202 by a lower clamp or spring 214 at a lower edge thereof. The top cap 206 includes an air feed line 220 extending therethrough that is connected to a source of compressed air (not shown).

The air spring top cap 206 includes a support 218 to which a jounce shock assembly 224 is mounted. The jounce shock assembly 224 extends into the cavity 216. In this embodiment, the jounce shock assembly 224 includes a body 226 that is preferably press-fit into the support 218. The body 226 may include an outwardly extending flange (not shown), similar to the flange 128 shown in FIG. 1, that abuts an lower surface of the top cap 206 when the body 226 is press-fit in the support 218. The body 226 is hollow and defines a chamber (not shown in FIG. 2). A jounce shock charging line 234 extends through a lower wall of the body 226 into the chamber and is connected to a supply of compressed gas, or more preferably a compressed gas/oil mixture.

The jounce shock assembly 224 also includes a rod 230 that is telescopically disposed in the body 226 and extends from a lower end thereof. The rod 230 has a piston (not shown in FIG. 2) connected to its upper end that seals around the periphery of the chamber while allowing the rod 230 to slide up and down relative to the body 226. As an alternative, the rod 230 may have a diameter generally matching that of the chamber, with the upper portion of the rod 230, in effect, forming an integral piston. A piston stop (not shown in FIG. 2) is fixed to the body 226 and located in the chamber to limit the downward travel of the rod 230. The chamber in the body 226, along with the piston will trap a compressed gas/oil mixture. The compressed gas/oil mixture will cause the rod 230 to move downward until the piston is seated against the stop.

The rod 230 also has a blunt-shaped rod cap 232 mounted on a lower free end. The air spring base 202 includes a reaction surface 222 facing the rod cap 232, preferably with a reaction feature 223 that is shaped to substantially conform to the rod cap 232. Under normal operating conditions, the piston stop determines the rest position of the piston, with the length of the rod 230 set so that there is a gap between the cap 232 of the rod 230 and the reaction surface 222.

The operation of the air spring and jounce shock assembly 200 is similar to that of the first embodiment. As the vehicle is driven under normal loading along relatively smooth terrain, the axle assembly 204 and frame 208 will move relative to one another, compressing and decompressing the air in the compressed air cavity 216, which supports the top cap 206 relative to the base 202. The jounce shock assembly 224 is sized and positioned so that the rod cap 232 remains spaced from the reaction surface 222 during the normal loading conditions. Accordingly, the air spring and jounce shock assembly 200 acts essentially as a conventional air spring under these driving conditions.

On the other hand, when the vehicle encounters terrain that causes a large energy input from an impact—such as a pothole or a curb—the air spring diaphragm 210 may allow the axle assembly 204 to drive the base 202 toward the top cap 206 and frame 208 to an extent that the rod cap 232 contacts the reaction surface 222. Any further movement of the base 202 toward the top cap 206 will now cause the reaction surface 222 to drive the rod 230 into the pressurized chamber. The substantial increase in the effective damping and suspension rate for this air spring and jounce shock assembly 200 over this last portion of travel will prevent the vehicle suspension from bottoming out on the frame. This eliminates the need for separate jounce bumpers (and packaging spaced for them) on the vehicle.

Figure 3:
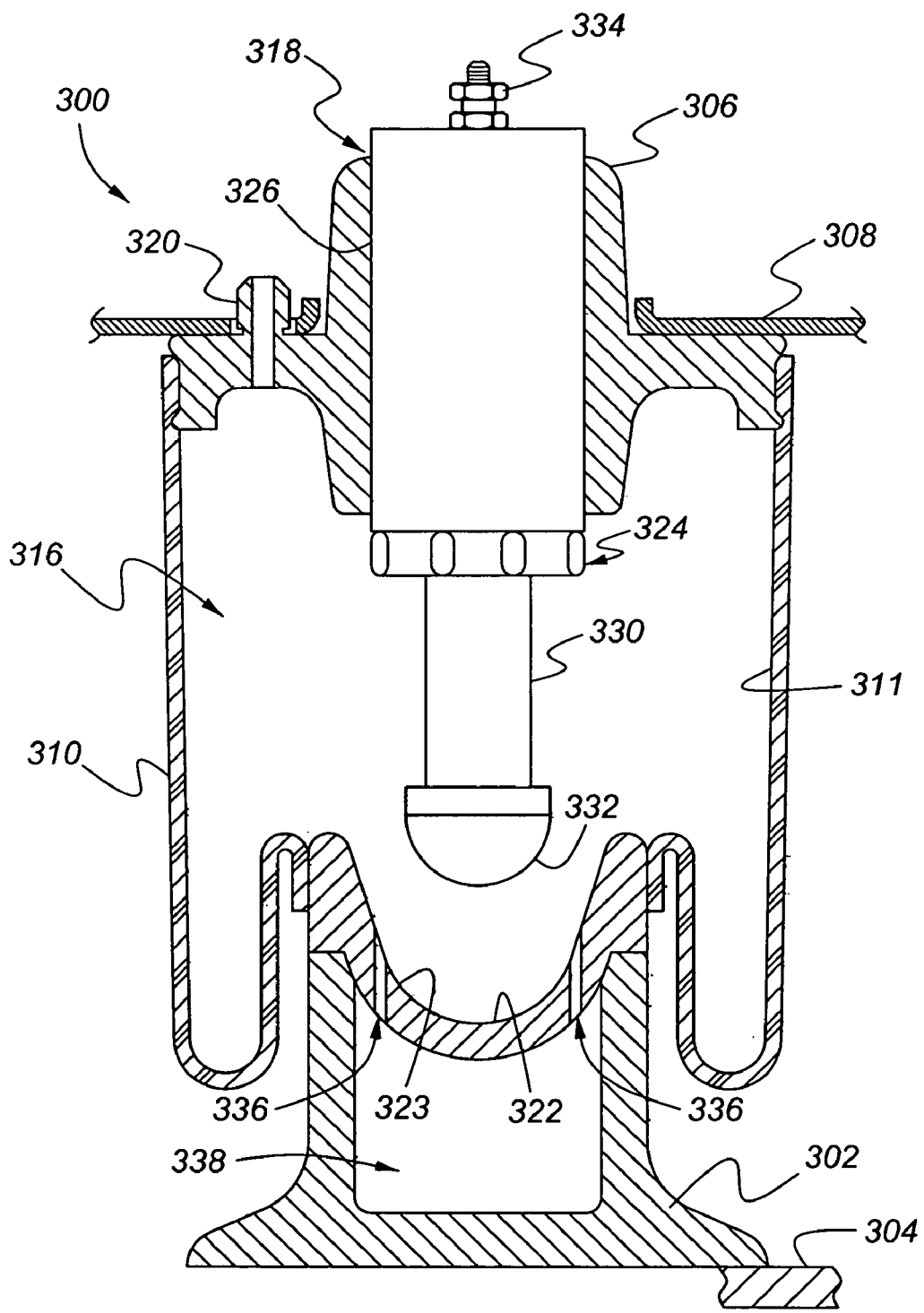
FIG. 3 is a partial cross sectional view of a third embodiment of an air spring and jounce shock assembly in accordance with the present invention.

Referring now to FIG. 3, a third embodiment of an air spring and jounce shock assembly in accordance with the present invention is indicated generally at 300. The assembly 300 includes an air spring base 302 that is attached to a vehicle axle assembly (or other suspension component, such as a control arm) 304. The assembly 300 also includes an air spring top cap 306 that is attached to a vehicle frame 308. An air spring diaphragm 310 is attached to and seals between the base 302 and the top cap 306. The diaphragm 310 includes an inner surface 311 that defines a compressed air cavity 316 between the base 302 and the top cap 306. The diaphragm 310 is preferably attached to the top cap 306 at an upper edge thereof by an upper clamp or spring (not shown in FIG. 3) and to the base 302 by a lower clamp or spring (not shown in FIG. 3) at a lower edge thereof. The top cap 306 includes an air feed line 320 extending therethrough that is connected to a source of compressed air (not shown).

The air spring top cap 306 includes a support 318 to which a jounce shock assembly 324 is mounted. The jounce shock assembly 324 extends into the cavity 316. In this embodiment, the jounce shock assembly 324 includes a body 326 that is preferably press-fit into the support 318. The body 326 may include an outwardly extending flange (not shown), similar to the flange 128 shown in FIG. 1, that abuts an lower surface of the top cap 306 when the body 326 is press-fit in the support 318. The body 326 is hollow and defines a chamber (not shown in FIG. 3). A jounce shock charging line 334 extends through a lower wall of the body 326 into the chamber and is connected to a supply of compressed gas, or more preferably a compressed gas/oil mixture.

The jounce shock assembly 324 also includes a rod 330 that is telescopically disposed in the body 326 and extends from a lower end thereof. The rod 330 has a piston (not shown in FIG. 3) connected to its upper end that seals around the periphery of the chamber while allowing the rod 330 to slide up and down relative to the body 326. As an alternative, the rod 330 may have a diameter generally matching that of the chamber, with the upper portion of the rod 330, in effect, forming an integral piston. A piston stop (not shown in FIG. 3) is fixed to the body 326 and located in the chamber to limit the downward travel of the rod 330. The chamber in the body 326, along with the piston will trap a compressed gas/oil mixture. The compressed gas/oil mixture will cause the rod 330 to move downward until the piston is seated against the stop.

The rod 330 also has a blunt-shaped rod cap 332 mounted on a lower free end. The air spring base 302 includes a reaction surface 322 facing the rod cap 332, preferably with a reaction feature 323 that is shaped to substantially conform to the rod cap 332. Under normal operating conditions, the piston stop determines the rest position of the piston, with the length of the rod 330 set so that there is a gap between the cap 332 of the rod 330 and the reaction surface 322. The air spring base 302 includes a plurality of passages 336 formed adjacent to the reaction feature 323. The passages 336 extend through the reaction surface 322 to an air spring base cavity 338. The air spring base cavity 338 is in fluid communication with the compressed air cavity 316 through the passages 336 and provides additional compressed air capacity for the assembly 300. Relative movement between the surfaces 304 and 308 causes relative movement between the air spring base 302 and the top cap 306. When the base 302 and the cap 306 move towards each other, the air trapped in the compressed air cavity 316 and the air spring base cavity 338 compresses, resulting in a greater resistance to continued relative movement between the base 302 and the top cap 306.

Those skilled in the art will appreciate that, as an alternative, the cap 306 of the assembly 300 may be formed with apertures and a top cap cavity (not shown), similar to the air spring base cavity 338 while remaining within the scope of the present invention.

The operation of the air spring and jounce shock assembly 300 is similar to that of the second embodiment. As the vehicle is driven under normal loading along relatively smooth terrain, the axle assembly 304 and frame 308 will move relative to one another, compressing and decompressing the air in the compressed air cavities 316 and 338, which support the top cap 306 relative to the base 302. The jounce shock assembly 324 is sized and positioned so that the rod cap 332 remains spaced from the reaction surface 322 during the normal loading conditions. Accordingly, the air spring and jounce shock assembly 300 acts essentially as a conventional air spring under these driving conditions.

On the other hand, when the vehicle encounters terrain that causes a large energy input from an impact—such as a pothole or a curb—the air spring diaphragm 310 may allow the axle assembly 304 to drive the base 302 toward the top cap 306 and frame 308 to an extent that the rod cap 332 contacts the reaction surface 322. Any further movement of the base 302 toward the top cap 306 will now cause the reaction surface 322 to drive the rod 330 into the pressurized chamber. The substantial increase in the effective damping and suspension rate for this air spring and jounce shock assembly 300 over this last portion of travel will prevent the vehicle suspension from bottoming out on the frame. This eliminates the need for separate jounce bumpers (and packaging spaced for them) on the vehicle.

Figure 4:
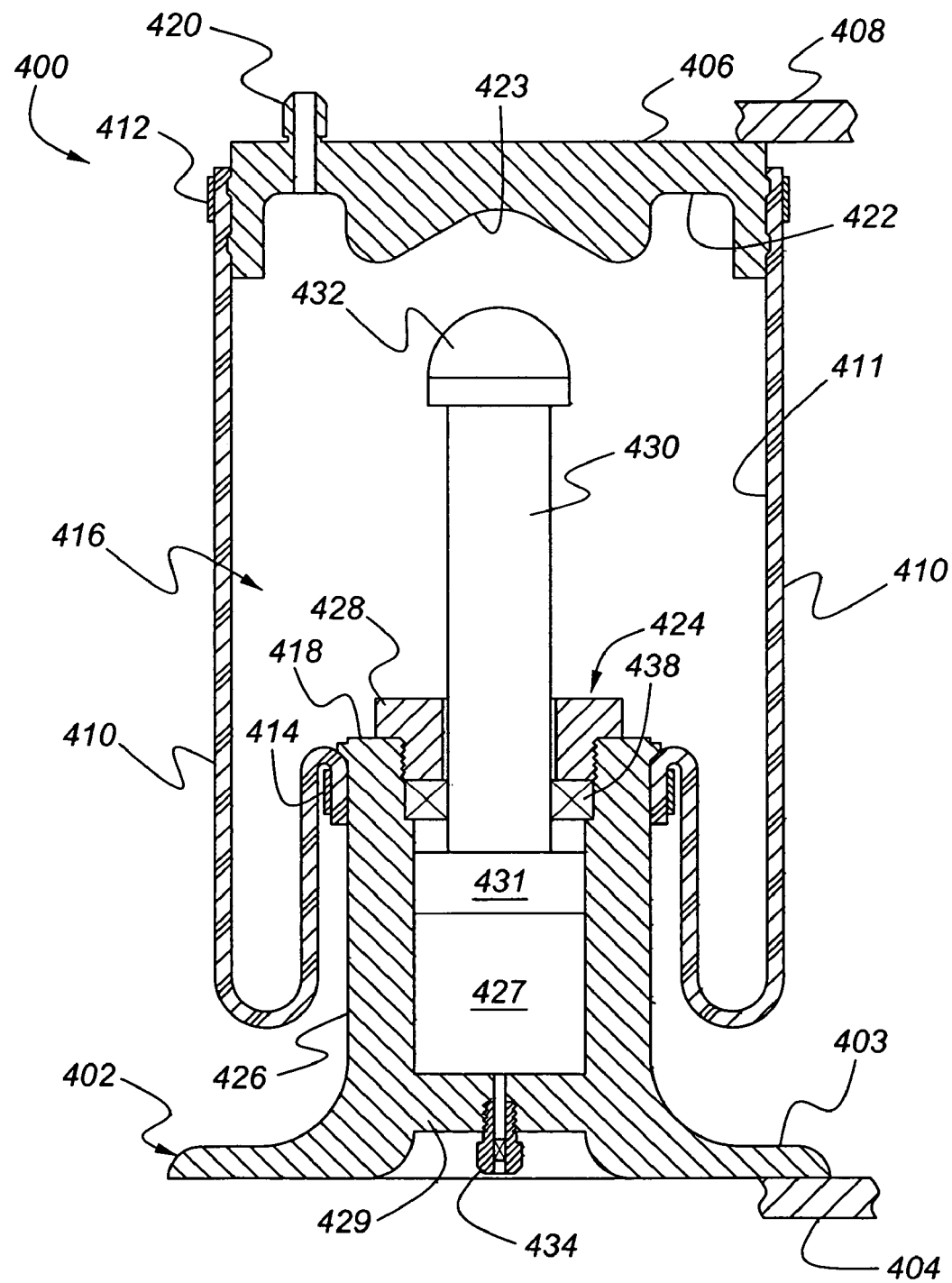
FIG. 4 is a partial cross sectional view of a fourth embodiment of an air spring and jounce shock assembly in accordance with the present invention.

Referring now to FIG. 4, a fourth embodiment of an air spring and jounce shock assembly in accordance with the present invention is indicated generally at 400. The assembly 400 includes an air spring base 402 that is attached to a vehicle axle assembly (or other suspension component, such as a control arm) 404. The base 402 is preferably formed of steel, aluminum, a composite material, or the like. The assembly 400 also includes an air spring top cap 406 that is attached to a vehicle frame (or body) 408. The cap 406 is also preferably formed of steel, aluminum, a composite material, or the like.

An air spring diaphragm 410 is attached to and seals between the base 402 and the top cap 406. The diaphragm 410 includes an inner surface 411 that defines a compressed air cavity 416 between the base 402 and the top cap 406. The diaphragm 410 is preferably formed of an elastomeric material such as rubber or the like, and is attached to the top cap 406 at an upper edge thereof by an upper clamp or spring 412 and to the base 402 by a lower clamp or spring 414 at a lower edge thereof. The top cap 406 includes an air feed line 420 extending therethrough that is connected to a source of compressed air (not shown).

The air spring base 402 includes a base portion 403 and an integrally formed and upwardly extending support 418 that is also integral with a body 426 of a jounce shock assembly 424. As defined herein, the term integral means the base portion 403, the upwardly extending support 418, and the body 426 are formed as a single piece and are not removable with respect to one another. The jounce shock assembly 424 extends into the cavity 416. The body 426 is hollow and defines a chamber 427. A jounce shock charging line 434 extends through a lower wall 429 of the body 426 into the chamber 427 and is connected to a supply of compressed gas, or more preferably a compressed gas/oil mixture.

The jounce shock assembly 424 also includes a rod 430 that is telescopically disposed in the body 426 and extends from an upper end thereof. The rod 430 has a piston 431 connected to its lower end that seals around the periphery of the chamber 427 while allowing the rod 430 to slide up and down relative to the body 426. A seal and piston stop 438 is fixed in the body 426 by a threaded flange member 428 and located in the chamber 427 to limit the upward travel of the piston 431. The seal and piston stop 438 also ensures that the gas/oil mixture in the cavity 427 remains therein. The chamber 427 in the body 426, along with the piston 431 will trap a compressed gas/oil mixture. The compressed gas/oil mixture will cause the rod 430 to move upward until the piston 431 is seated against the seal and piston stop 438.

The rod 430 also has a rod cap 432 with a blunt shape mounted on an upper free end. The top cap 406 includes a reaction surface 422 facing the rod cap 432, preferably with a reaction feature 423 that is shaped to substantially conform to the rod cap 432. Under normal operating conditions, the seal and piston stop 438 determines the rest position of the piston 431, with the length of the rod 430 set so that there is a gap between the cap 432 of the piston 430 and the reaction surface 422.

Those skilled in the art will appreciate that the body of the jounce shock assembly of the second and third embodiments may be formed integrally with the air spring top cap assembly, similar to the integral body in this fourth embodiment, while remaining within the scope of the present invention.

The operation of the air spring and jounce shock assembly 400 is similar to the first embodiment. As the vehicle is driven under normal loading along relatively smooth terrain, the axle assembly 404 and frame 408 will move relative to one another, compressing and decompressing the air in the compressed air cavity 416, which supports the top cap 406 relative to the base 402. The jounce shock assembly 424 is sized and positioned so that the rod cap 432 remains spaced from the reaction surface 422 during the normal loading conditions. Accordingly, the air spring and jounce shock assembly 400 acts essentially as a conventional air spring under these driving conditions.

On the other hand, when the vehicle encounters terrain that causes a large energy input from an impact—such as a pothole or a curb—the air spring diaphragm 410 may allow the axle assembly 404 to drive the base 402 toward the top cap 406 and frame 408 to an extent that the rod cap 432 contacts the reaction surface 422. Any further movement of the base 402 toward the top cap 406 will now cause the reaction surface 422 to drive the rod 430 into the pressurized chamber 427. The substantial increase in the effective damping and suspension rate for this air spring and jounce shock assembly 400 over this last portion of travel will prevent the vehicle suspension from bottoming out on the frame. This eliminates the need for separate jounce bumpers (and packaging spaced for them) on the vehicle.

While certain embodiments of the present invention have been described in detail, those familiar with the art to which this invention relates will recognize various alternative designs and embodiments for practicing the invention as defined by the following claims.

What is claimed is:

1. An air spring and jounce shock assembly for use in a vehicle suspension system comprising:
    a base adapted to be mounted on one of an axle assembly and a suspension component;
    a top cap adapted to be attached to a vehicle frame;
    a diaphragm disposed between and attached to the base and the top cap, the diaphragm including an inner surface defining a first portion of a compressed air cavity;
    a jounce shock reaction surface defining a second portion of the compressed air cavity and included in a one of the top cap and the base; and
    a jounce shock assembly disposed in the air cavity in opposed relation to the jounce shock reaction surface and affixed to an other of the top cap and the base, the jounce shock assembly including a body, affixed to the other of the top cap and the base and defining a compressed gas chamber, and a rod having a first end portion in the compressed gas chamber sealably engaged with and slidable relative to the body and a second end portion telescopically slidable from the body and located to selectively engage the jounce shock reaction surface.

2. The assembly according to claim 1 wherein the jounce shock assembly is affixed to the base, and the body is integral with the base.

3. The assembly according to claim 1 wherein the jounce shock assembly is affixed to the top cap and the base includes an air spring base cavity in fluid communication with the compressed air cavity.

4. The assembly according to claim 1 wherein the compressed gas chamber is filled with a mixture of a compressed gas and oil.

5. The assembly according to claim 1 wherein the second end portion of the rod includes a rod cap, and the jounce shock reaction surface includes a reaction feature that is in alignment with and shaped to substantially conform to the rod cap.

6. The assembly according to claim 5 wherein the first end portion of the rod includes a piston in the compressed gas chamber that is sealably engaged with and slidable relative to the body.

7. The assembly according to claim 1 wherein the first end portion of the rod includes a piston in the compressed gas chamber that is sealably engaged with and slidable relative to the body.

8. The assembly according to claim 7 wherein the jounce shock assembly further includes a piston stop mounted to the body and located to limit the travel of the piston relative to the body.

9. The assembly according to claim 7 wherein the jounce shock assembly further includes a seal and piston stop mounted to the body and located to limit the travel of the piston relative to the body and sealably engaged with the rod.

10. The assembly according to claim 1 wherein the body includes a jounce shock charging line for providing a passage adapted for receiving a supply of compressed gas to the compressed gas chamber.

11. An air spring and jounce shock assembly for use in a vehicle suspension system comprising:
a base adapted to be mounted on one of an axle assembly and a suspension component;
a top cap adapted to be attached to a vehicle frame;
a diaphragm disposed between and attached to the base and the top cap, the diaphragm including an inner surface defining a first portion of a compressed air cavity;
a jounce shock reaction surface defining a second portion of the compressed air cavity and included in the top cap; and
a jounce shock assembly disposed in the air cavity in opposed relation to the jounce shock reaction surface and affixed to the base, the jounce shock assembly including a body, affixed to the base and defining a compressed gas chamber, and a rod having a first end portion in the compressed gas chamber sealably engaged with and slidable relative to the body and a second end portion telescopically slidable from the body and located to selectively engage the jounce shock reaction surface.

12. The assembly according to claim 11 wherein the body is integral with the base.

13. The assembly according to claim 11 wherein the body is press fit to the base.

14. The assembly according to claim 13 wherein the body further includes a radially extending flange in engagement with the base, with the radially extending flange supporting the body relative to the base.

15. The assembly according to claim 11 wherein the first end portion of the rod includes a piston in the compressed gas chamber that is sealably engaged with and slidable relative to the body.

16. The assembly according to claim 11 wherein the jounce shock reaction surface includes a reaction feature that is in alignment with and shaped to substantially conform to the second end portion of the rod.

17. An air spring and jounce shock assembly for use in a vehicle suspension system comprising:
a base adapted to be mounted on one of an axle assembly and a suspension component;
a top cap adapted to be attached to a vehicle frame;
a diaphragm disposed between and attached to the base and the top cap, the diaphragm including an inner surface defining a first portion of a compressed air cavity;
a jounce shock reaction surface defining a second portion of the compressed air cavity and included in the base; and
a jounce shock assembly disposed in the air cavity in opposed relation to the jounce shock reaction surface and affixed to the top cap, the jounce shock assembly including a body, affixed to the top cap and defining a compressed gas chamber, and a rod having a first end portion in the compressed gas chamber sealably engaged with and slidable relative to the body and a second end portion telescopically slidable from the body and located to selectively engage the jounce shock reaction surface.

18. The assembly according to claim 17 wherein the body is press fit to the top cap.

19. The assembly according to claim 17 wherein the base includes an air spring base cavity in fluid communication with the compressed air cavity.

20. The assembly according to claim 17 wherein the second end portion of the rod includes a rod cap, and the jounce shock reaction surface includes a reaction feature that is in alignment with and shaped to substantially conform to the rod cap.

* * * * *